(12) United States Patent
Iesaka

(10) Patent No.: US 7,091,954 B2
(45) Date of Patent: Aug. 15, 2006

(54) COMPUTER KEYBOARD AND CURSOR CONTROL SYSTEM AND METHOD WITH KEYBOARD MAP SWITCHING

(76) Inventor: Kazuho Iesaka, 331 E. 17th St., #3A, New York, NY (US) 10003

(\*) Notice: Subject to any disclaimer, the term of this patent is extended or adjusted under 35 U.S.C. 154(b) by 178 days.

(21) Appl. No.: 10/196,975

(22) Filed: Jul. 17, 2002

(65) Prior Publication Data
US 2003/0201982 A1 Oct. 30, 2003

Related U.S. Application Data

(63) Continuation-in-part of application No. 10/135,293, filed on Apr. 30, 2002.

(51) Int. Cl.
H09G 5/00 (2006.01)
(52) U.S. Cl. ............... 345/168; 345/156; 345/157
(58) Field of Classification Search ........ 345/156–169, 345/172–179; 178/18.01–18.07, 19.01–19.06; 341/20–33
See application file for complete search history.

(56) References Cited

U.S. PATENT DOCUMENTS

| | | | | |
|---|---|---|---|---|
| 5,189,403 A | \* | 2/1993 | Franz et al. | 345/172 |
| 5,422,993 A | \* | 6/1995 | Fleming | 715/835 |
| 5,485,614 A | | 1/1996 | Kocis et al. | |
| 5,864,334 A | | 1/1999 | Sellers | |
| 5,914,702 A | | 6/1999 | Derocher et al. | |
| 6,181,325 B1 | | 1/2001 | Lee | |
| 6,434,447 B1 | \* | 8/2002 | Shteyn | 700/245 |
| 6,501,464 B1 | \* | 12/2002 | Cobbley et al. | 345/173 |

\* cited by examiner

*Primary Examiner*—Vijay Shankar
(74) *Attorney, Agent, or Firm*—Lucas & Mercanti, LLP

(57) ABSTRACT

Disclosed is a computer keyboard and cursor control system and method for use with a computer having a pointing device operated by a user. Upon determining that the user is operating the pointing device, the invention switches to a different keymap, so as to remap at least one typing key on the keyboard into other functional key(s) such as a "left mouse click" function button.

20 Claims, 12 Drawing Sheets

COMPUTER KEYBOARD AND CURSOR CONTROL SYSTEM AND METHOD WITH KEYBOARD MAP SWITCHING

CROSS-REFERENCE TO RELATED APPLICATION

This application is a continuation-in-part of prior copending U.S. patent application Ser. No. 10/135,293, filed Apr. 30, 2002, by the inventor of the present invention. Such application is incorporated by reference herein.

FIELD OF THE INVENTION

This invention relates to computer keyboards, and more specifically to computer keyboards with finger-operated or hand-operated cursor control devices.

BACKGROUND OF THE INVENTION

Various types of cursor control or pointing device systems for computer are in common use today. They include the mouse, trackball, touchpad, touchscreen, joystick, pointing stick and others, and are found on almost all desktop and laptop or notebook computers, and on some personal digital assistants, game consoles and other devices where a cursor on a display screen must be manually controlled by one or more fingers of a user. The pointing device may be either external to the keyboard, as in a traditional mouse, or built-in to the keyboard console, as in many laptop computers.

Several different functions normally must be performed by the pointing device system. Not only must the cursor be moved around the screen, but also objects such as hyperlinks on a Web page or local program icons, on the screen must often be selected or activated. This of course is traditionally accomplished on a regular mouse by cursor select or "mouse click" button(s).

Today, most personal computers have two "click buttons" located either on the mouse itself or mounted on or near the keyboard console. The "left click" button normally activates the cursor-selected object (e.g., causes the computer to "jump" to a new screen such as through a hyperlink, or causes a program to be activated or "launched"), and the "right click" button normally is available for determining "properties" or other optional information about the screen object, such as file location or size, or for performing specialized functions. Also, increasingly, more than two "click buttons" are often being provided to offer greater control over more sophisticated tasks such as photo or video editing.

Traditional pointing devices and click buttons have some disadvantages. Consider, for example, the touch pad or track pad device found on many notebook computers. A typical prior art touchpad arrangement is shown in FIG 1. Here, laptop computer keyboard 10 has a plurality of text typing keys 20, a touchpad 30 a left click button 40 and a right click button 50. The touchpad is typically located a short distance below the bottom row of keys (toward the user), and the click buttons are typically placed immediately below the touchpad.

In normal operation, the user is expected to use his or her index finger for the touchpad and the thumb of the same hand for the click buttons. For example, for a right-handed user, the user drags his or her right index finger over the surface of the touchpad to move the cursor around the screen. Capacitive or other touch-sensing electronics associated with the touchpad convert the finger movement into cursor control signals that are interpreted through graphics processors or display processors, and the operating system, to control the visible cursor on the screen.

Optical sensing is also sometimes used for some touch screens. When the cursor has reached its intended "target", such as, over a live link or icon desired to be activated, the cursor is halted and the right-handed user (for example) pushes the left click button with the right thumb. The left hand normally is not doing anything at this time.

Unlike a regular desktop mouse, however, it is difficult for some users to push the left or right click buttons with the thumb while the index finger of the same hand remains on or just above the touchpad. For example, when the index finger is placed on the bottom-left corner of the touchpad 30 of FIG. 1, it is difficult to push the left click button 40 by the thumb. It is also difficult, for the same reason, to use the touchpad to "drag" files into "folders" or other areas on the screen. Furthermore, it has been found that users (right-handed users in this case) almost always feel uncomfortable when they push the right click button 50 by the thumb while the index finger remains on the touchpad 30. The uncomfortableness is exacerbated if the user has large fingers or finger dexterity is limited in some way.

A different arrangement is available on some notebook or laptop computers. For example, some notebook computers have a small joystick or pointing stick located approximately in the center of the keyboard and nestled among the keys. Some users feel comfortable with this arrangement because of a different cursor control feeling or because the user may not need to move his or her hands from the home position on the keyboard. But the basic operation of the click buttons in this arrangement is the same as with the traditional touchpad. Although the click buttons are not immediately adjacent to the pointing device, they are still in the same position relative to the user. In other words, in this arrangement, the click buttons are normally located below the bottom row of typing keys (toward the user) to allow for operation by the thumb of the same hand that is operating the pointing device. In this arrangement, it is still uncomfortable for many users to press the left or right click button by the thumb.

It has been discovered that the above-mentioned difficulties and uncomfortable feelings arise in large part from the relative positions of the touchpad and click buttons found on many traditional notebook computers. As mentioned previously, the click buttons are normally located immediately below, or even touching, the touchpad. Thus, the thumb must be brought very close to, or in contact with, the index finger when a click button must be pressed.

It has also been discovered that this uncomfortableness is also due to the clicking motion of the thumb itself. Because of the relative positions of the pointing device (such as the touchpad or joystick) and the click buttons, the user normally must use the radial (lateral) side of the thumb, even if the click buttons are located some distance away from the pointing device. But in this arrangement, the clicking motion is not performed using the normal kinetics of the thumb. It may cause some uncomfortableness, dullness, pain or joint member degeneration over time.

Another challenge for modern cursor control devices is that notebook (or laptop or portable) computers are becoming more powerful every year. This means that more and more users are increasingly using notebook computers for heavy, complex tasks such as photo-editing, 3-D modeling, CAD/CAM computer animations or scientific calculations. These heavy tasks increasingly require the use of a multi-button mouse or other pointing device having more than two click buttons, which may have "window scroll" buttons, to scroll contents of a window, and/or "page up/down" buttons, to move pages back and forward. Since most notebook computers with built-in pointing devices currently have only two click buttons, many,users of these heavy tasks must carry around an external pointing device such as a multi-button mouse with their notebook computers, which is burdensome for the mobile user.

Various specialized cursor control devices have been proposed in the prior art. See, for example, the following U.S. Pat. No. 5,864,334; Sellers et al. U.S. Pat. No. 5,485,614 Kocis; U.S. Pat. No. 6,181,325 Lee ; and et al. U.S. Pat. No. 5,914,702 Derocher. However, these prior art devices typically require unusual finger movements, extra keyboard keys, unusual click button shapes or expensive additional hardware such as cameras to accomplish cursor control and click button activation, and they do not in any event completely solve the problems mentioned above.

Thus, in light of the above-mentioned difficulties and challenges in the prior art, a need exists for a computer keyboard with a cursor control device to improve cursor functionality and user comfort while "clicking", and to avoid the need for an external multi-button mouse or other pointing device.

SUMMARY OF THE INVENTION

Disclosed is a computer keyboard and cursor control system having a device and method for switching between two or more key maps. Preselected keys of the keyboard, or all keys, may be dynamically and immediately switched by the user from a "typing mode" to a "cursor mode" in real time (while using the computer) simply by touching or otherwise operating a pointing device (cursor control device). In the normal "typing mode" (i.e. when the user is not using the pointing device, and does not intend to use the pointing device at that moment), the user is doing nothing, or is striking keyboard keys to input characters. Normally, it is assumed that the user does not wish to use the pointing device while in the "typing mode". In the "cursor mode" (i.e. the user is touching or otherwise using the pointing device), if the user desires, selected keyboard keys are temporarily "remapped" into other functions, such as "mouse click" buttons, "window scroll" buttons, and "page up/down" buttons, while the hands remain on the keyboard in the home position, thus improving speed and efficiency.

In a feature of the invention, the pointing device is used to signal an input controller to activate the remapping of selected keys, and the pointing device itself also remains active at all times so that the cursor may continue to be removed in conventional fashion, if desired. In this way, the user may operate a "click" function by pressing one of the remapped keys with any finger of either hand. This permits both hands to be used independently, thus more efficiently, and it also permits a natural flexion/extension finger motion to be used rather than a radial motion by a thumb.

Remapped keys can perform not only "click" functions, but also any kind of function(s) such as execution of one or more commands; execution of one or more command scripts, which contain programmed commands; output of texts, characters, symbols and/or figures; "window scroll" functions; "page up/down" functions; launching one or more applications; opening one or more files; controlling volume of speaker(s); controlling brightness of computer displays; and so on. Also, since some application programs have their own, specific, sets of "shortcut" keys or "hot keys", each application may have its own "cursor mode" key map for remapped keys. It is important to note that virtually any kind of single function or a script of serial functions (command scripts) can be mapped into remapped keys (i.e. keys in "cursor mode"). Thus, the invention virtually provides another complete set of keys for every application, including the operating system, while the user is touching or otherwise using the pointing device (while in "cursor mode").

When a right-handed user, for example, is controlling the cursor by using a touchpad or joystick, the user's left hand and fingers normally are not doing anything. Of course, in some applications, users may use "hot keys" or "short-cut keys." (A "shortcut key" is a combination of a few keys or buttons that can command some frequently used functions, such as "save a file" or "print a document.") Normally, however, the left hand is "free." This means that the left hand also can perform "mouse clicking" functions, "window scroll" functions, and/or "page up/down" functions, if desired.

As a result, the left hand is resting for most of the time, but it is still on the keyboard. Consequently, functions of one or more keys on keyboard can be switched on and off by the touchpad using the right hand fingers. When a right hand finger is on the touchpad ("cursor mode"), selected keys on the keyboard are available to operate as, for example, "mouse click" buttons, "window scroll" buttons and/or "page up/down" buttons. When the right hand finger is off the touchpad, keys on the keyboard are available to operate (and should operate) as regular text typing keys ("typing mode").

For example if the "F" key is defined as an alternate left mouse click button, the user can use the "F" key as the original "F" key while he or she wishes to input ordinary characters (type normally) by taking his or her right hand off of the touchpad and placing it in on the keyboard. But when the user is operating the mouse cursor by using the touchpad, the "F" key operates as a "left mouse click" button, and the user can click the button by using the "F" key. If desired, another key such as the "S" or "L" key may be programmed to operate as a "right mouse click" button upon selection by the user. Additional click buttons, window scroll buttons, page up/down buttons, and/or any kind of functional keys may also be included. This capability of the present invention offers a significant benefit in that the user can operate another complete set of keys without using additional hardware or an additional key switch. Speed, efficiency, portability and convenience are therefore remarkably increased.

BRIEF DESCRIPTION OF THE DRAWINGS

These and other features and advantages of the invention will now be described with reference to the drawings of certain preferred embodiments, which are intended to illustrate and not to limit the invention, and in which like reference numbers represent corresponding parts throughout, and in which.

DETAILED DESCRIPTION OF THE INVENTION

In what follows, an embodiment of the present invention will be described in detail with reference to the accompanying drawings.

Figure 1:
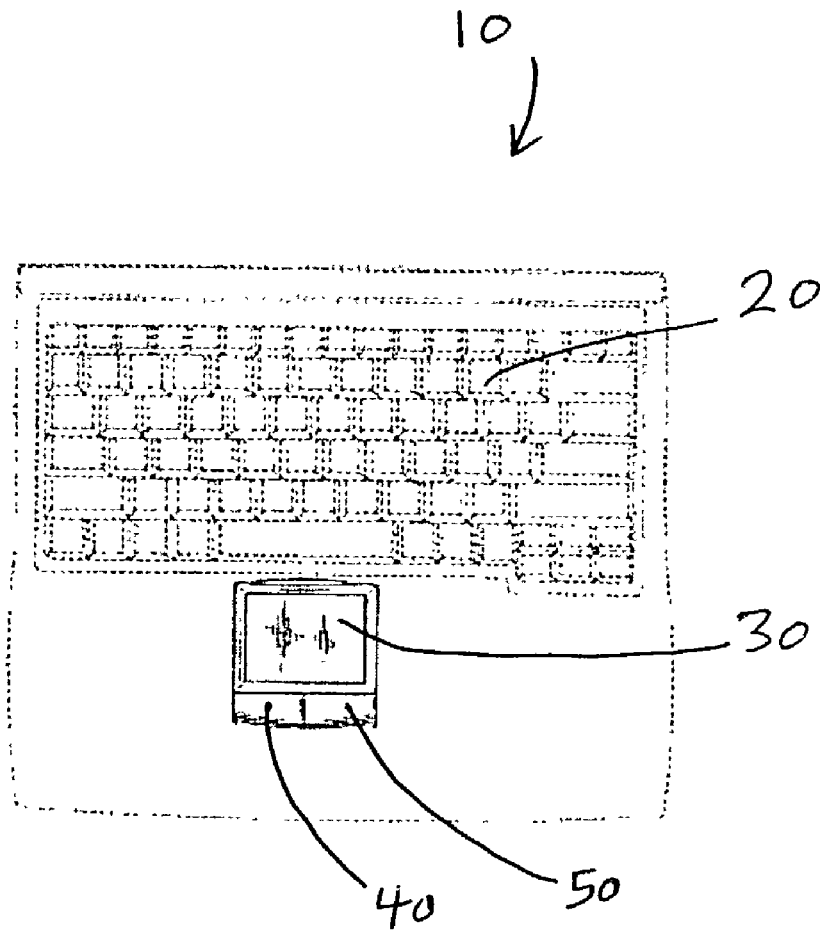
FIG. 1 is a top view of a typical prior art laptop computer keyboard with a conventional trackpad or touchpad and its associated cursor select or "mouse click" buttons.

FIG. 1 is a top view of a typical prior art laptop computer keyboard with a conventional touchpad and its associated cursor select or "mouse click" buttons. As has previously been discussed, this arrangement has certain disadvantages due to the close proximity of the click buttons to the touchpad and also due to an unnatural movement by the thumb that is normally required to press the buttons. Usually, the number of mouse click buttons is also limited to two. These disadvantages are overcome by the present invention.

Figure 2:
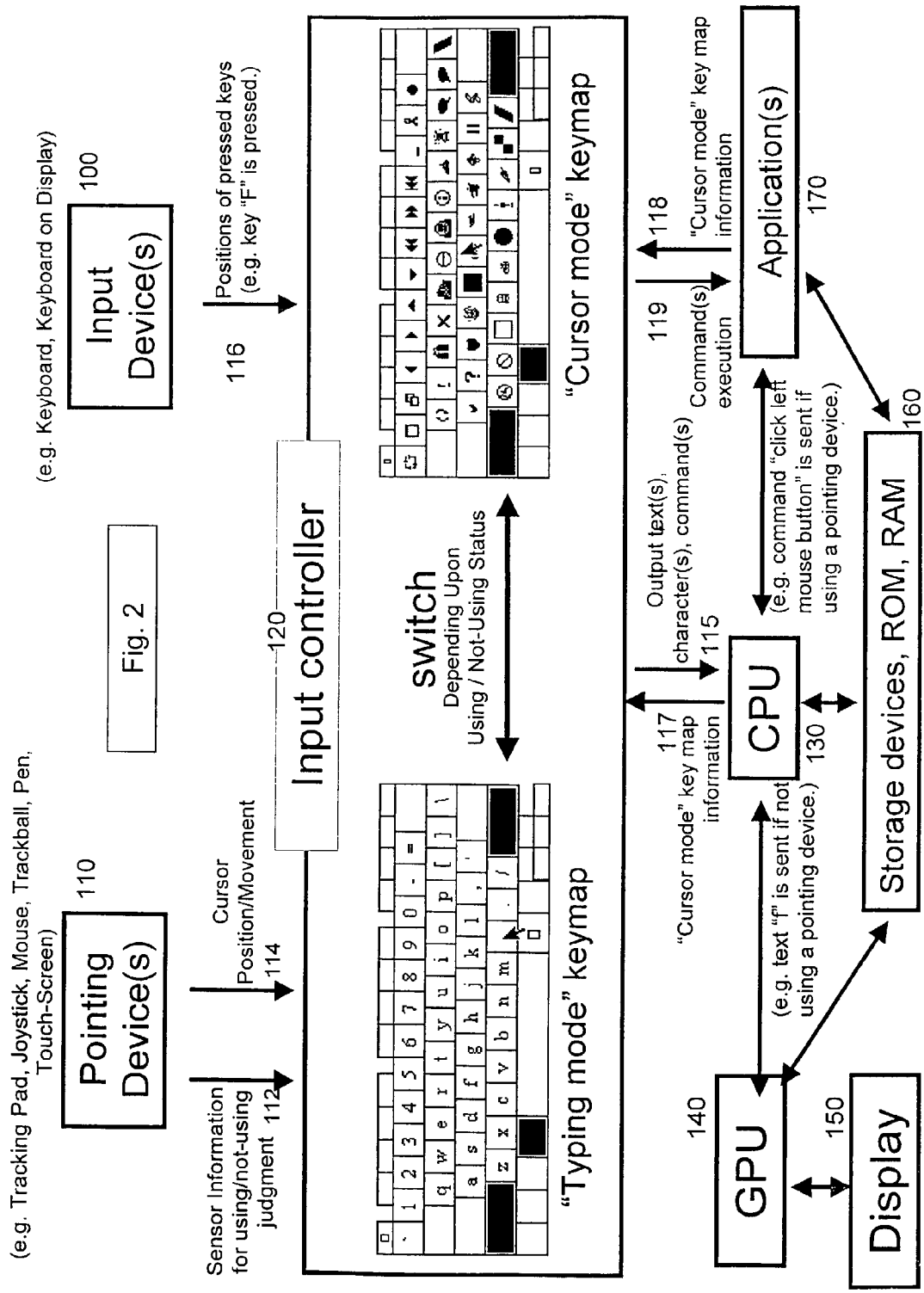
FIG. 2 is a combined block/pictorial diagram illustrating one embodiment of the present invention.

FIG. 2 is a combined block/pictorial diagram illustrating one embodiment of the present invention in which a novel keyboard-map-switching system is incorporated into a computer. In a preferred embodiment, the system includes an input device 100, such as a keyboard with conventional keys or a keyboard displayed on a touch-screen, for typing and other tasks; a pointing device or cursor control device 110; an input controller 120; a display screen 150; a central processing unit (CPU) 130; a graphical processing unit (GPU) 140; one or more storage devices 160, such as read-only memory (ROM), random access memory (RAM) and/or a hard disk drive; and one or more applications or programs 170 running on CPU 130 and available for execution under the control of CPU 130 and an operating system (not shown).

Pointing device 110 may comprise a touchpad, trackpad, pointing stick, trackpoint, joystick, mouse, trackball, pen (pen tablet) or a touch-screen. Preferably, pointing device 110 is physically located on or near the keyboard 100, so as to be within easy reach of a user. More than one pointing device may be provided.

Pointing device 110 may include a switch or sensor having an output line 112 for outputting an electrical signal upon the detection of a finger touching, or in close proximity to, the pointing device. The sensor may comprise a mechanical switch that is activated by finger movement, or a pressure sensor activated by finger pressure, or a capacitive, electrostatic, magnetic or optical sensor activated by a slight touch of a finger or hand, or activated by the close proximity of a finger or hand to the pointing device 110. A separate hardware switch is not, however, required.

In one embodiment, the system of the invention is configured so that a user's finger touch on the pointing device 110 (or the detection of close finger proximity to the pointing device) is interpreted to mean that the user intends to immediately use the pointing device 110 to cause a mouse cursor (not shown) to start moving across the display 150. Preferably, finger pressure or movement on the pointing device 110 in a downward direction (i.e., in a direction substantially perpendicular to the plane of the pointing device or keyboard) is interpreted as indicating that the user wishes to start moving the cursor, but a downward direction is not required. For example, if a user touches the pointing device 110 from the side from any direction, this will also be interpreted as a command to immediately begin controlling the cursor. When the user is using a pen tablet, either the user's touching the pen or the pen touching the tablet may be interpreted as a "using" sign.

Because every pointing device is a sensor in itself, information for detecting whether a user is touching or otherwise using the pointing device may be provided without an additional hardware sensor attached to the pointing device. For example, a touchpad or trackpad is a touching sensor or a pressure sensor in itself because it needs to detect the motion of the user's finger to control the cursor. Thus, a touchpad or trackpad may output both cursor movement information and touching/not-touching information without an additional line or sensor.

Pointing devices that have poor sensing ability, such as the joystick, track stick, desktop mouse or trackball, might not be able to detect a finger touching by themselves. To solve this problem, in one embodiment of the invention, one or more additional sensors can be applied or attached to the pointing device so that the input controller can detect a finger touching or in close proximity to, the pointing device by processing the signals from the additional sensor(s) (see FIG. 12).

In the present invention, a signal representing an actual physical touching of the user's finger on the pointing device is not always required to detect whether the user is using or not using the pointing device. For example, pointing device 110 may also include conventional electronic, optical or other means for sensing finger movement or pressure that is intended by the user as a command to actually cause cursor movement itself. Electrical signals representing intended cursor movement are outputted over output line 114 upon detection of finger movement or pressure in a plane that is substantially parallel to the plane of the pointing device (if flat), or keyboard (if flat).

In another embodiment, the signals representing intended cursor movement may also be used by input controller 120 to infer that the user is using or intends to use the pointing device. By referencing these signals, input controller 120 can detect the beginning and the end of the cursor's movement. Input controller 120 can assume that the user is using the pointing device while the mouse cursor is moving. Thus, input controller 120 can assume, for example, that the user is touching the pointing device from the moment the mouse cursor begins to move until a certain time interval (such as one second) has elapsed since the last movement of the cursor. Thus, the input controller 120 does not always require the sensing of an actual "touching" by the user's finger.

Thus, it can be seen that pointing device 110 activates two distinct functions. One function is to provide information about whether or not the user wishes to move or activate the cursor at all (i.e., switch from a "typing mode" to a "cursor mode"). The user's decision whether or not use the pointing device is sometimes referred to herein as a "using/not-using status." This in turn controls a keyboard remapping operation, discussed below. The other function activated by pointing device 110 is to initiate and operate actual cursor movement itself.

Pointing device 110 is electrically coupled to an input controller 120 via lines 112 and 114, which may be combined if desired. Input device 100 is electrically coupled to controller 120 via line 116. In a preferred embodiment, input controller 120 comprises a semiconductor integrated circuit chip configured to receive, interpret and process electrical signals via lines 112, 114 and 116, and to provide output electrical signals to CPU 130. Signals from line 112 comprise signals from the pointing device itself or from a sensor within or attached to pointing device 110 indicating that a finger is touching or nearly touching the pointing device. Signals from line 114 comprise signals from pointing device 110 indicative of finger pressure or movement on the pointing device 110 in a direction corresponding to the direction of actual cursor movement on the display 150 intended by the user. Signals from line 116 comprise signals from input device 100 indicative of the positions of pressed keys, such as, for example, if the "F" key is pressed.

Line 112 and line 114 may be included into a single line when, for example, the pointing device and/or input controller can provide both a finger touching information for switching keymaps and cursor movement information for controlling the cursor on the screen.

In a feature of the invention, input controller 120 processes the signals from lines 112 and 116 and activates a "remapping" of the keys on input device 100.

Figure 12:
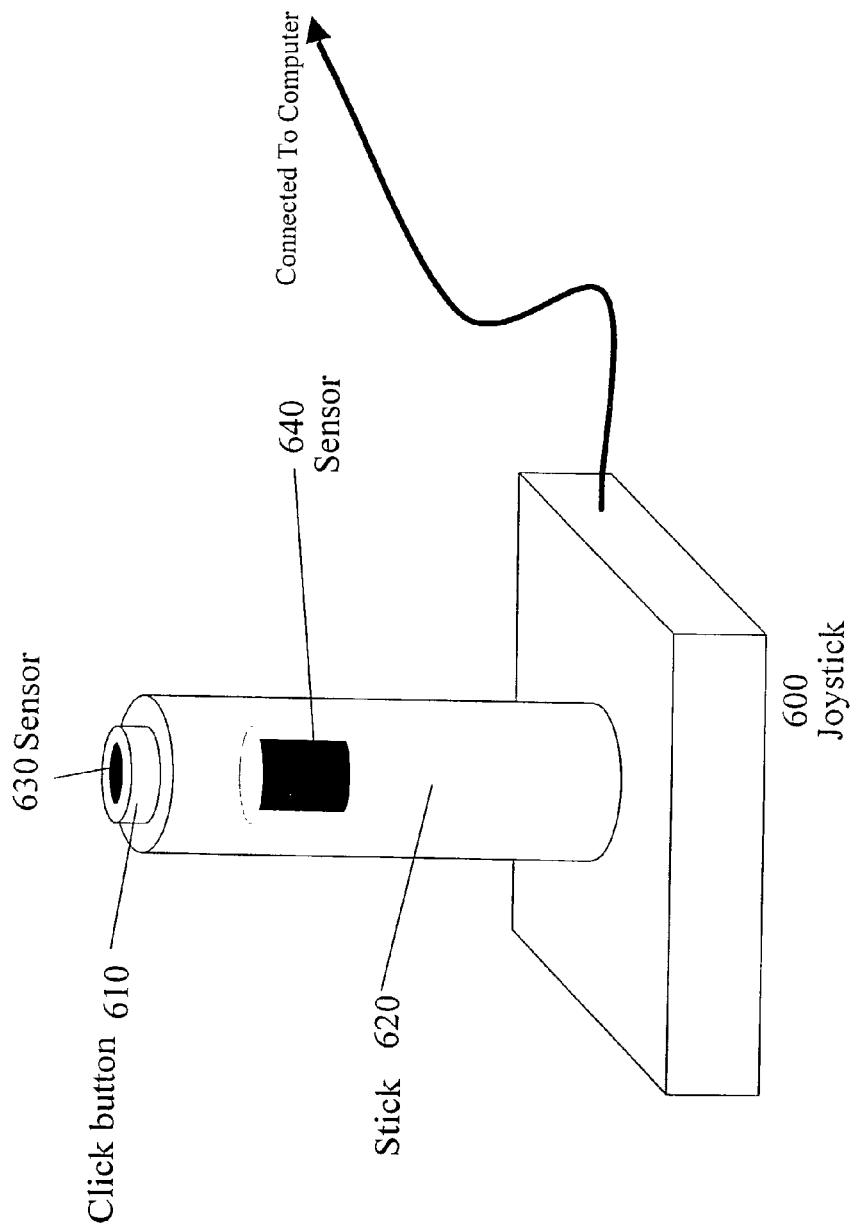
FIG. 12 shows an example of a sensor attached to a pointing device to indicate whether the user's finger is touching the pointing device.

There are at least four ways to determine whether the user is in fact touching or otherwise using or intending to use the pointing device ("using/not using" status): (1) utilize pointing device 110 as a sensor in itself without an additional sensor(s) (in other words, utilize the ordinary sensing ability (function) of the pointing device which is usually used to interpret the motion of the user's finger or hand into electrical signals to operate the mouse cursor); (2) utilize special signals from an additional sensor(s) (FIG. 12); (3) utilize signals representing cursor movement on the screen by defining a period of "using the pointing device" based on the movement of the cursor symbol on the screen (as opposed to physical movement of the user's finger on the pointing device); or (4) detect a "text-edit (input)" object that has been activated by the user.

In a preferred embodiment, in the absence of a sensor or other "cursor in use" signal, a "typing mode" keymap is selected by input controller 120 by default, and the "F" key operates in normal "typing mode." In other words, pressing the "F" key causes the letter "F" to appear on the display 150. In the presence of a sensor or other "cursor in use" signal, the normal typing mode is disabled, and controller 120, in association with CPU 130 and the operating system (not shown), switch the keymap from "typing mode" to "cursor mode" and causes the "F" key to function as a "left mouse click" button, for example. (See FIG. 8.) Optionally, the "S" key may also be disabled and remapped to function as a "right mouse click" button, for example.

This remapping (switching) procedure in this invention can remap (switch) any keys on the keyboard into any kind of function(s) that a computer can execute, such as "window scroll" functions, "page up/down" functions, and so on. The function(s) of the remapped keys ("cursor mode" keys) may be a single command such as "click", "scroll" or "open file(s)", or may be serial commands or command script(s) (programmed commands such as "Macro" commands) such as "make a copy of a certain file and move the copy into a certain folder" or "launch a certain command script(s), Macro file(s) or application(s)". Because the special keys are, in a sense, function keys that switch function(s) of other key(s) to other function(s), special keys, such as "shift" key, "ctrl" key, "command" key, "alt" key, and/or "windows" key, may also be mapped onto "cursor mode" keymap. In other words, "special key function(s)" can be mapped onto "cursor mode" keymap.

The "cursor mode" keymap can define every function for every combination of pressed keys in the same way as the "typing mode" keymap usually can. If the "cursor mode" keymap has one or more "special" keys, the functions of other keys active while the special key(s) are held pressed must be defined by one or more keymaps. For example, if there is a "ctrl" key on the "cursor mode" keymap, the functions of other keys while the "ctrl" key is held pressed must also be defined by one or more keymaps so that the user can use shortcut keys by using the "ctrl" key. This means that the "cursor mode" keymap can offer its own set of shortcut keys to the user during "cursor mode". This is an important difference between this invention and regular special keys found in the prior art such as the shift key. While a shift key switches functions of other keys (for example, to capitalize letters) except its own function, this invention switches the functions of all keys including special keys, and then it also offers another complete keymap which may include newly defined special keys, shortcut keys and function keys. Each application program may define a different set of special keys, shortcut keys and function keys. Thus, the user may switch not only between one "typing mode" key map and one "cursor mode" key map, but also between an entire group of "typing mode" key maps and an entire group of "cursor mode" key maps.

Of course, if the user so desires to avoid confusion, the "cursor mode" keymap(s) may be configured to present the same set of special keys and shortcut keys that the "typing mode" keymap has. This allows the user, if desired, to use the same set of shortcut keys no matter which keymap is selected.

Execution of commands is accomplished by sending the commands to CPU 130 or to application(s) 170 via line 119. Similarly, some applications have their own set of shortcut keys, and in this case the input controller changes the "cursor mode" keymaps depending on which application is currently running or activated. Application(s) can provide information of its own "cursor mode" keymap to input controller 120 via line 118 or via CPU 130 and line 117. Input controller 120 may ask or "interrogate" CPU 130 about which application is currently running or active. Then, input controller 120 accesses the active or running application's own keymap and changes the "cursor mode" keymap into the keymap that is designated as the "cursor mode" keymap by the active or running application.

Each time the active or running application is switched by the user, input controller 120 changes the "cursor mode" keymap to the designated one. Thus, this invention virtually provides another complete set of keys for each application while a user is touching or otherwise using the pointing device. The remapping functionality may either be hard-wired into input controller 120, or provided under software control by a keyboard "driver", operating system software or other running or activated application 170. Input controller 120 is not always necessary if CPU 130, a keyboard driver, operating system, or an application can provide functions equal to input controller 120.

CPU 130 is a conventional semiconductor processor chip such as a Pentium® chip manufactured by Intel Corp., for controlling the main operations of a computer in conjunction with a conventional operating system (not shown) such as Microsoft Windows®, Linux, Apple OSX, etc. CPU 130 is electrically coupled to graphics processor unit (GPU) 140, a conventional processor for driving the display 150. CPU 130 and GPU 140 are each also electrically coupled to storage devices 160.

The operation of the invention may be summarized as follows. As a user manipulates the pointing device 110, such as with a finger, the pointing device sends cursor position or movement signals, and "cursor in use" signals (i.e., signals representing the user's using/not using status) to the input controller 120. As a user types normally, the keyboard or other input device sends signals representing pressed key positions (i.e., which key(s) of the keyboard are being pressed at any given time) to the input controller. The input controller, either alone or in conjunction with the CPU 130, operating system and/or keyboard driver software, "decides" immediately whether the user is using ("cursor mode") or not using ("typing mode") the pointing device, and then selects or switches to the appropriate key map based on the "decision". Data representing the key maps are stored in one or more of the storage devices 160. Then, the input controller sends either conventional text typing commands of a "typing mode" keymap, or remapped, switched commands of a "cursor mode" keymap (such as "mouse click" commands) to the CPU, graphics processor unit and/or application(s) for ultimate command execution, depending upon which key map has been selected by the user.

Figure 3:
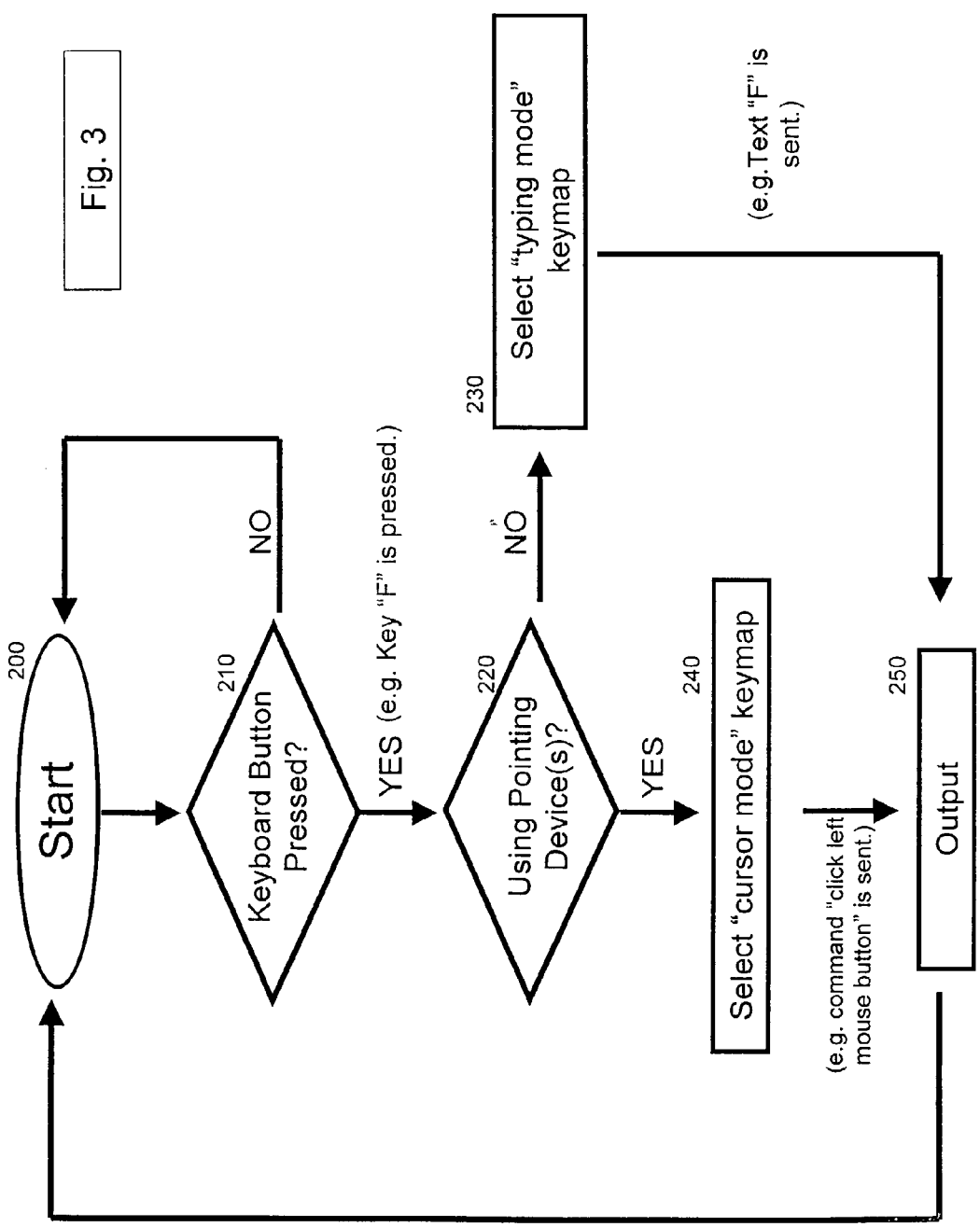
FIG. 3 is a flowchart illustrating the operation of one embodiment of the invention.

FIG. 3 is a flowchart illustrating the logical operation of one embodiment of the present invention in more detail. At step 200, there is no user activity (i.e., the user's finger's are not touching either the keyboard/input device 100 or the pointing device 110, or the user is otherwise idle.) In this embodiment, at decision block 210, the "system" (meaning the input controller 120 and/or the CPU 130 with an associated operating system) "interrogates" the keyboard at rapid intervals (for example, every few microseconds or milliseconds) to "see" if any key is being pressed. If the user remains inactive, the input controller 120 receives either no response signal or a "negative" response signal from the keyboard, indicating an idle condition, and the cycle keeps repeating.

As soon as a key is pressed, the input controller 120 receives a "positive" response signal from the keyboard 100 that a specific key has been pressed, and operation passes to decision block 220. Here, the input controller immediately interrogates the pointing device 110 to see if the user's finger is touching or near the pointing device, or if the user is otherwise using the pointing device. If not, the system "assumes" that the user simply wants to type normally, and an appropriate "typing mode" keymap is selected by the system at step 230. Then, the text of whatever key has been pressed (for example, the "F" key) is outputted at step 250 to the GPU 140 and then to the display.

If, however, the input controller 120 at step 220 determines that the pointing device 110 has been touched, or if the user is otherwise using or intends to use the pointing device, then the system "assumes" that the user does not want to type at that moment but instead wants to move or click the cursor (it being assumed that the user does not want to both type and move the cursor at the same time). In this situation, an appropriate "cursor mode" keymap is selected by the input controller and/or CPU or GPU at step 240, and a "left click" function signal is outputted at step 250 for execution (such as to launch an application 170 or activate a Web hyperlink if the cursor is positioned over an active screen area such as an icon or link at that moment). Operation is then returned to step 200.

Figure 4:
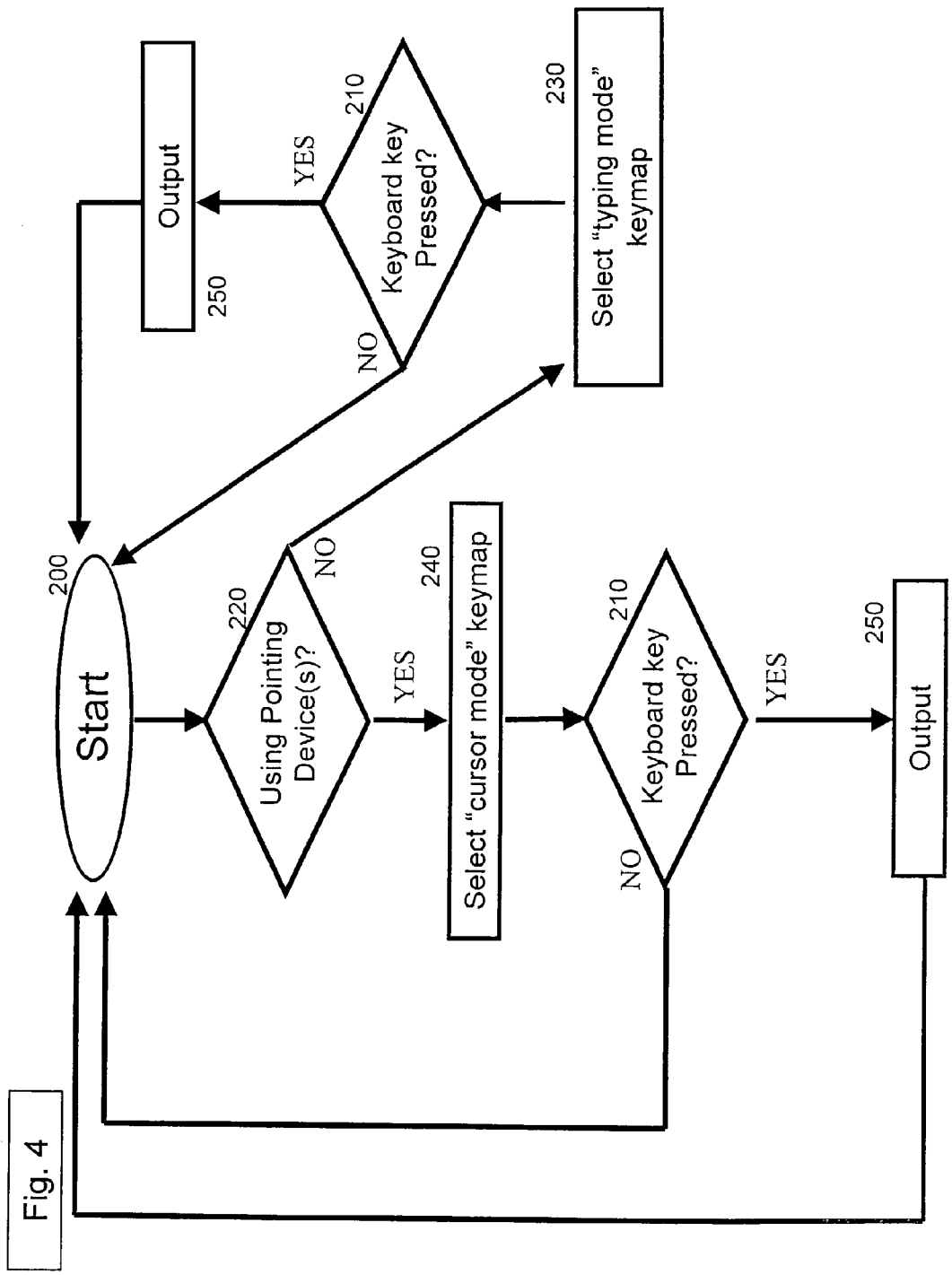
FIG. 4 is a flowchart illustrating the operation of another embodiment of the invention.

Steps 210 and 220 of FIG. 3 may be reversed, if desired, or performed in parallel. FIG. 4 is a flowchart showing steps 210 and 220 reversed.

Figure 5:
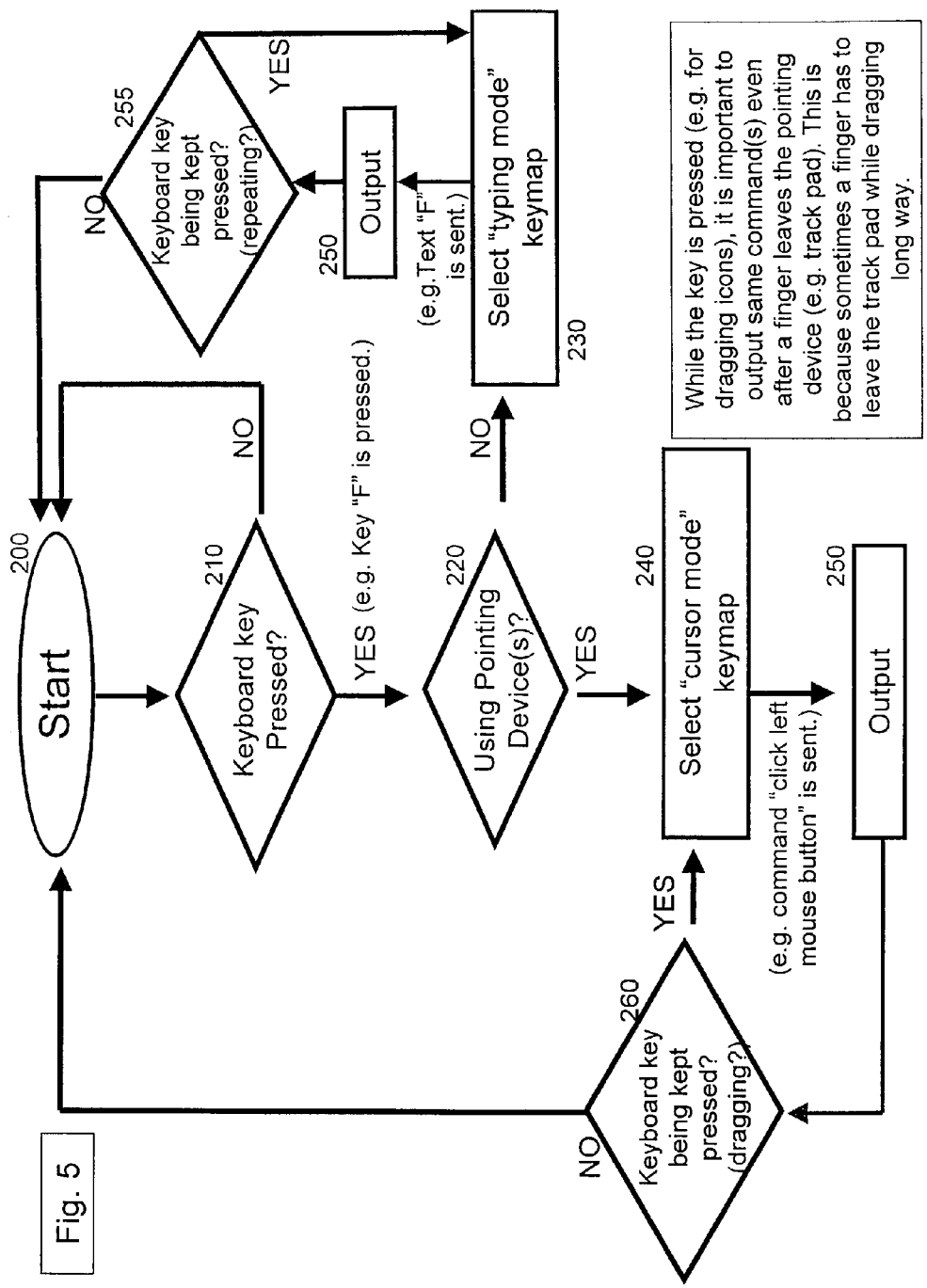
FIG. 5 is a flowchart illustrating the operation of another embodiment of the invention.

FIG. 5 is a flowchart illustrating the logical operation of another embodiment of the present invention. This embodiment takes into account a possible "dragging" situation that the user may be faced with. On occasion, some users have a need to "drag" an icon or other object from one area of the screen to another. For example, a user may wish to drag a file icon to a particular folder or to a "recycle bin." On some computers, to accomplish this, the user must hold down the left click button and control the pointing device at the same time. If a touchpad is being used as the pointing device, and the object must a dragged a long distance across the screen, the user's finger may reach the edge of the touchpad before the screen object has been fully dragged across the screen. At this point, the user will need to momentarily lift his or her finger off the touchpad and move it to the other side to continue the dragging motion, resulting in a reciprocating motion with the finger. This situation is easily handled by the present invention. In such a situation, the input controller 120 sends the same command (e.g. "click left mouse button", while dragging) repeatedly until the user's finger leaves a keyboard key (stops pressing a key). This permits dragging to be performed even after the user's finger leaves the touchpad.

An opposite situation sometimes also occurs with many users. For example, if a user presses a key and holds it down while not using the pointing device, this normally means that the user intends for the key to be repeated. For example, on most computers, holding down the "X" key will produce a string of X's on the screen. This "repeat function" is useful and important to many users. The present invention easily accommodates this function, in that the input controller 120 sends the same "key pressed" typing signal to the CPU 130 even if the user simultaneously touches the pointing device 110, until the user stops pressing the key.

Both of the above-mentioned situations ("dragging situation" and "repeat key situation") are easily handled by configuring the input controller so that the keymap active at that moment is never switched while one or more keys are held pressed. It is useful to keep the pointing device active as a cursor control device while keymap switching is frozen. This is not only because the user can drag object(s) but also because some kinds of applications which deal with 3-dimensional objects, such as CAD software or 3D animation editor, let the user rotate 3-dimensional objects on the display by operating the pointing device to control the rotation while holding down a certain hot-key.

Referring to FIG. 5, at step 200, there is no user activity. In this embodiment, at decision block 210, the "system" (meaning the input controller 120 and/or the CPU 130 and an associated operating system) "interrogates" the keyboard at rapid intervals (for example, every few microseconds or milliseconds) to "see" if any key is being pressed. If the user remains inactive, the input controller 120 receives either no response signal or a "negative" response signal from the keyboard, indicating an idle condition, and the cycle keeps repeating.

As soon as a key is pressed, the input controller 120 receives a "positive" response signal from the keyboard 100 that a specific key has been pressed, and operation passes to decision block 220. Here, the input controller immediately interrogates the pointing device 110 to determine if the user's finger is touching or near the pointing device, or if the user is otherwise using or intending to use the pointing device. If not, the system "assumes" that the user simply wants to type normally, and an appropriate "typing mode" key-map is selected by the system at step 230. Then, the text of whatever key has been pressed (for example, the "F" key) is outputted at step 250 to the CPU 130 and/or GPU 140 and then to the display 150.

Next, at step 255, the input controller 120 "asks" whether the keyboard key is being kept pressed, an indication that the user wishes to repeat the key function (repeat "F", for example) while holding down the key. This situation could be determined to exist either if the input controller receives a steady "key pressed" signal from the keyboard, or receives a series of rapid "key pressed" signals from the keyboard in response to repeated interrogation by the input controller. If a "continued key pressed" condition is determined to exist at step 255, the "typing mode" key map is again selected at step 230, and the "F" key, for example, continues to function as a text "F" output key. This functionality is then again enabled by the system and outputted to CPU 130 and GPU 140 at step 250. As soon as no further "key pressed" condition is detected at step 255, operation returns to step 200.

If, however, the input controller 120 at step 220 sees that the pointing device 110 has been touched, or that the user is otherwise using the pointing device, then the system "assumes" that the user does not want to type at that moment but instead wants to move or click the cursor, such as to drag an object across the screen. In this situation, an appropriate "cursor mode" key-map is selected at step 240, and a "left click" function signal is outputted at 250 for execution (such as to launch an application 170, drag object(s), or activate a Web hyperlink if the cursor is positioned over an active screen area such as icon or link at that moment), for example.

Next, at step 260, the input controller 120 "asks" whether the keyboard key is being kept depressed, an indication that the user wishes to "click and drag" a screen object by moving the cursor while simultaneously holding down the left click button. This situation could be determined to exist either if the input controller receives a steady "key pressed" signal from the keyboard, or receives a series of rapid "key pressed" signals from the keyboard in response to repeated interrogation by the input controller. If a "continued key pressed" condition is determined to exist at step 260, the "cursor mode" keymap is again selected at step 240, and the "F" key, for example, continues to function as a left click button. This functionality is then again enabled by the system and outputted to CPU 130, GPU 140 and/or application 170 at step 250. As soon as no further "key pressed" condition is detected at step 260, operation returns to step 200.

Steps 210 and 220 of FIG. 5 may be reversed, if desired, or performed in parallel.

Figure 6:
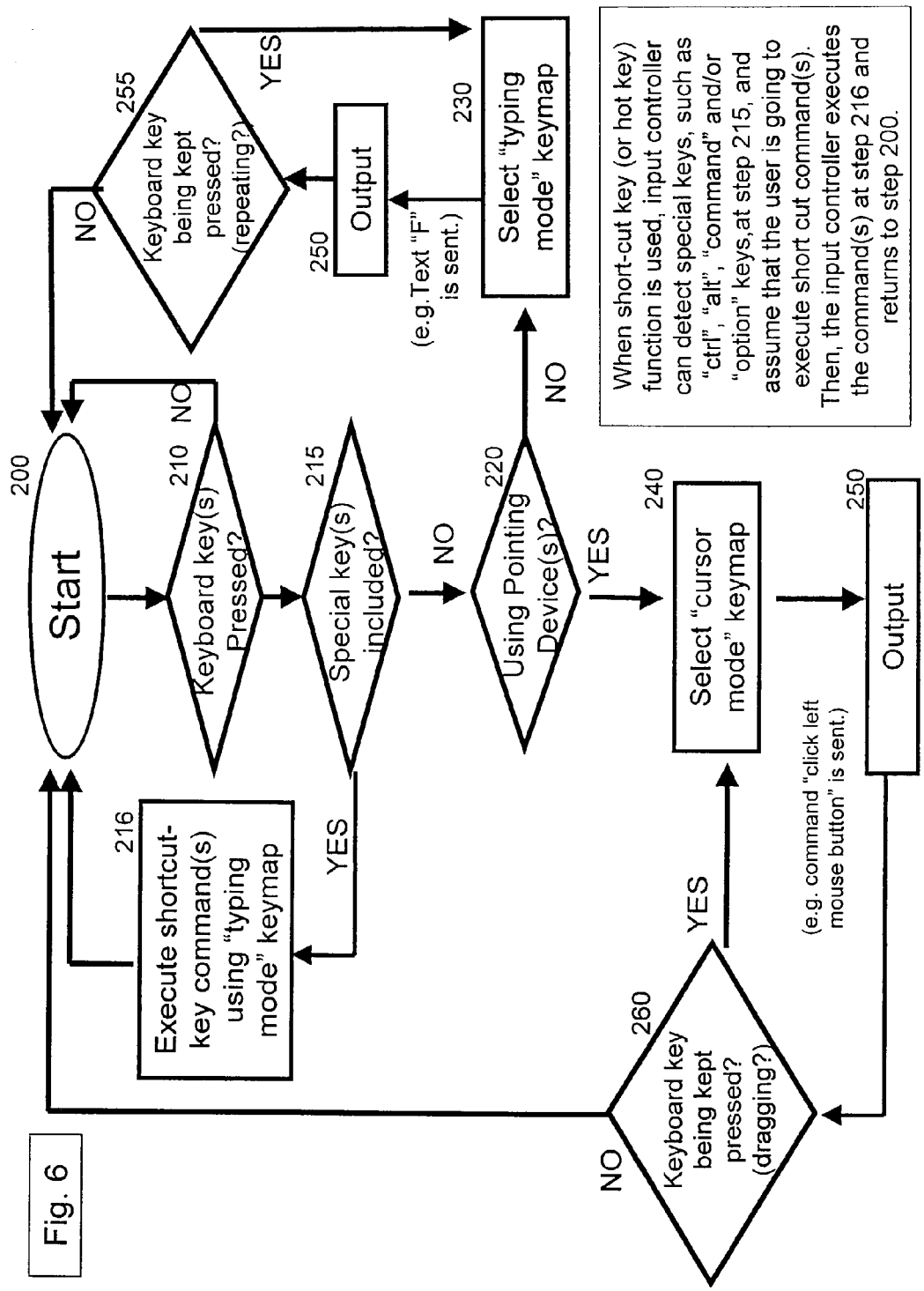
FIG. 6 is a flowchart illustrating the operation of another embodiment of the invention.

FIG. 6 is a flow chart illustrating the logical operation of another embodiment of the present invention. This embodiment takes into account one or more "shortcut key(s)" or "hot key(s)" that the user may wish to use during both "typing mode" and "cursor mode". On occasion, some users have a need to use "shortcut key(s)" or "hot key(s)" to execute one or more command(s), which are defined by system software or application software, by pressing certain key(s) in combination with "special key(s)" such as "ctrl", "alt", "command", and/or "option" key(s). A problem in this "shortcut key(s)" situation is that the user may wish to use shortcut keys while using the pointing device. This is a problem because the system might not be able to recognize the shortcut key(s) since the keymap had previously been switched to the "cursor mode" keymap by using the pointing device. This problem is easily handled by the present invention. In such a situation, the input controller 120 can easily recognize the shortcut key by detecting "special key(s)" in pressed keys, because "shortcut key(s)" usually include "special key(s)" such as "ctrl", "alt", "command", and/or "option" key(s). When the input controller detects any kind of "special key(s)" at step 215 in FIG. 5, the input controller assumes that one or more shortcut key(s) are pressed, and go to step 216, select "typing mode" keymap, execute a corresponding shortcut-command(s), and return to step 200. At step 216, it may be preferable to select the "typing mode" keymap before executing a shortcut key command(s) because conventional shortcut key(s) may require a conventional keymap (normally the "typing mode" keymap).

Of course, the "cursor mode" keymap(s) may be configured to present the same set of special keys and shortcut keys that the "typing mode" keymap has. This allows the user, if desired, to use the same set of shortcut keys no matter which keymap is selected.

Operations in steps 200 to 260 in FIG. 6 are identical with those of FIG. 5 except those of steps 215 and 216, which are described above.

Steps 210 and 220 of FIG. 6 may be reversed, if desired, or performed in parallel.

Figure 7:
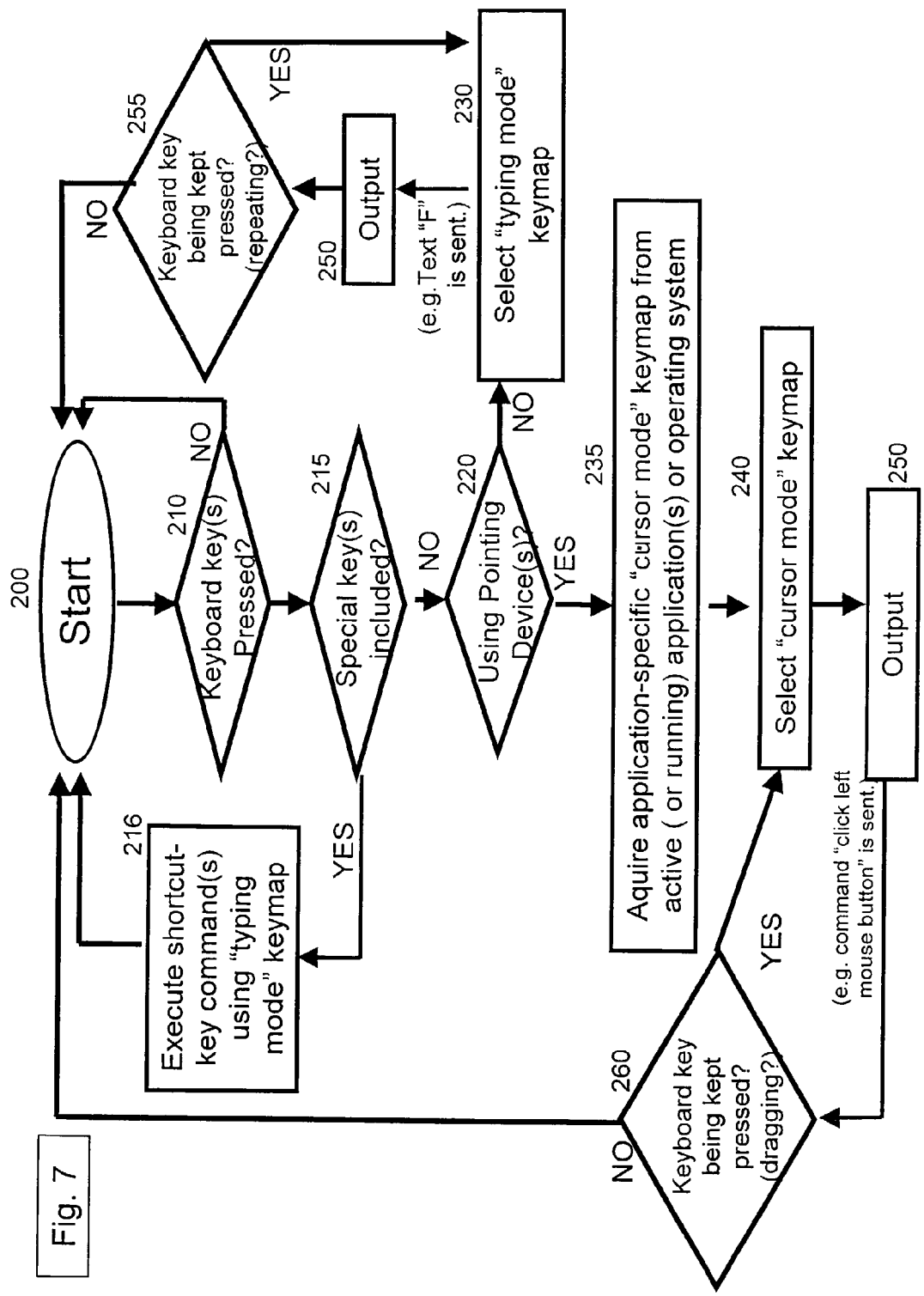
FIG. 7 is a flowchart illustrating the operation of another embodiment of the invention.

FIG. 7 is a flowchart illustrating the logical operation of another embodiment of the present invention. This embodiment takes into account changing the "cursor mode" keymap depending upon an activated or running application(s) at the time of operation. Generally, an application designates its own shortcut key commands. For example, pressing the "S" key while holding the "ctrl" key down may output a "Save a file" command in one application but it may output a "Sort" command in another application. (I.e., command(s) of a certain combination of keys (shortcut keys) will typically vary depending on the application.)

On occasion, an application may designate its own, application-specific "cursor mode" keymap similar to that it designates for its own short cut key commands. At step 235 in FIG. 7, the input controller 120 accesses an application-specific "cursor mode" key map data (stored in one or more of the storage devices 160) before it switches the keymap to "cursor mode" key map at step 240 and outputs command(s) at step 250. To acquire application-specific "cursor mode" keymaps, the input controller "asks" CPU 130 or activated application(s) 170 for the data representing that application's "cursor mode" keymap(s) through line 117 and/or 118 in FIG. 2. By this operation at step 235, the user can thus use many kinds of "cursor mode" keymaps by changing active or running application(s). Speed, efficiency, and convenience are therefore remarkably improved by preparing, storing and using application-specific "cursor mode" keymaps because such keymaps can be custom-designed for application-specific tasks, such as page back/forward buttons designed for web browser software. Operations in steps 200 to 260 in FIG. 7 are identical with those of FIG. 6 except that of step 235, which is described above.

Steps 210 and 220 of FIG. 7 may be reversed, if desired, or performed in parallel.

Figure 8:
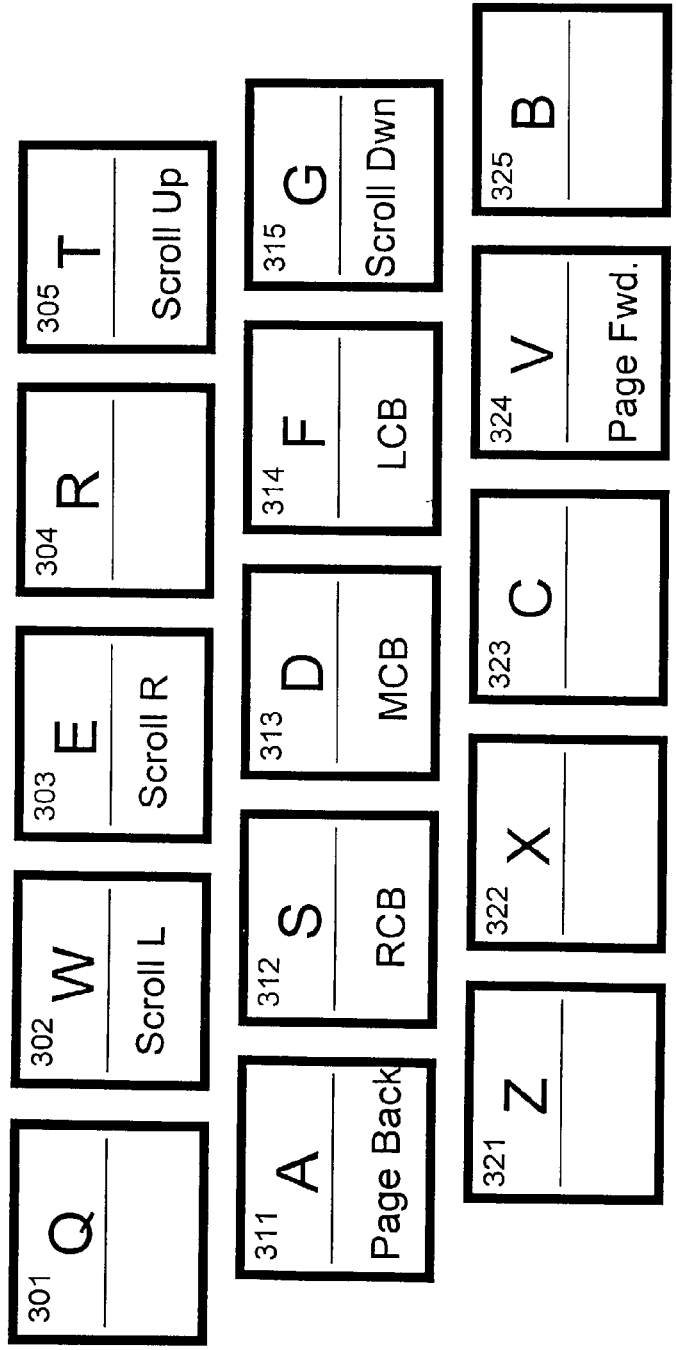
FIG. 8 shows an example of a "cursor mode" key map for a right-handed user.

FIG. 8 shows an example of a "cursor mode" keymap for right-handed users. Keys 311 to 314 represents the "home" position keys on a conventional QWERTY keyboard for the little finger, ring finger, middle finger, and the index finger, respectively, of the left hand. The upper half of each key indicates the "typing mode" keymap function. The lower half of each key indicates the "cursor mode" keymap function. "RCB", "MCB", and "LCB" represent "right mouse click button function", "middle mouse click button function", and "left mouse click button function" during "cursor mode", respectively. In this example, the user may simulate a "3-button mouse" operation by using the index, middle and ring fingers during "cursor mode". Moreover, during "cursor mode", the user may use keys 302 and 303 to scroll window contents to the right and left, and may use keys 305 and 315 to scroll window contents up and down. Keys 311 and 324 may perform page up/down (back/forward) functions during "cursor mode". This example of a "cursor mode" keymap is especially useful for Web browser applications or text editing applications because it has page control keys and scroll keys. Since the most frequently used functions in Web browser applications include the "page back" function and the "scroll up/down" functions, it is useful to place these function keys on or close to the home position keys, as shown in FIG. 8. It may seem counterintuitive at first to map the "F" key into the "left click button" in this example, since the F key is actually to the right of the middle click button ("D" key) in FIG. 8. However, since the left click button is used far more often than the right click button, it has been discovered that greater user comfort and control is achieved if the index finger is the finger to be used for left mouse clicking.

Figure 9:
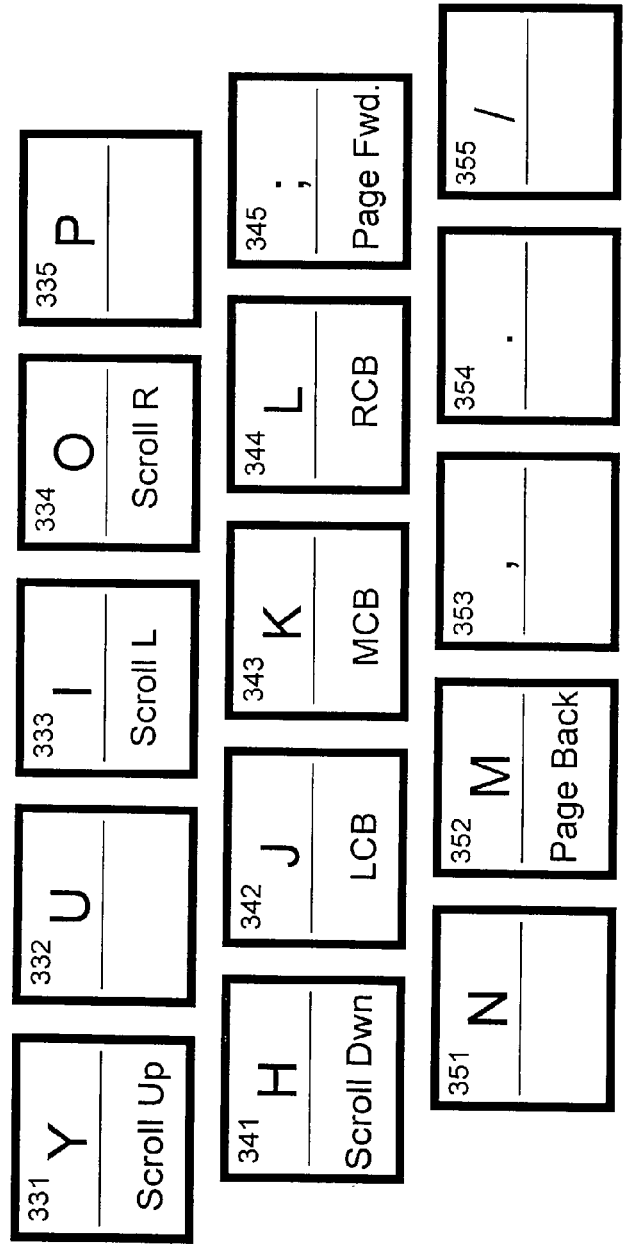
FIG. 9 shows an example of a "cursor mode" key map for a left-handed user.

FIG. 9 shows an example of a "cursor mode" keymap that is designed for left-handed users. This example is an approximate mirror image of the example in FIG. 8, except that the positions of the "page fwd" button, "page back" button, "scroll L" button, and "scroll R" button are placed in the same way as in FIG. 8. Keys 342 to 345 represents home position keys for the index finger, middle finger, ring finger, and the little finger, respectively, of the right hand. The upper half of each key indicates the "typing mode" keymap function. The lower half of each key indicates the "cursor mode" keymap function. "RCB", "MCB", and "LCB" represent "right mouse click button function", "middle mouse click button function", and "left mouse click button function" during "cursor mode", respectively. In this example, the user may simulate a 3-button mouse operation by using the index, middle and ring fingers during "cursor mode". Moreover, during "cursor mode", the user may use keys 333 and 334 to scroll window contents to the left and right, and may use keys 331 and 341 to scroll window contents up and down. Keys 352 and 345 may perform page up/down (back/forward) functions during "cursor mode". This example of a "cursor mode" keymap is especially useful for Web browser applications or text editing applications because it has page control keys and scroll keys. Since the most frequently used functions in Web browser applications include the "page back" function and "scroll up/down" functions, it is useful to place these function keys on or close to the home position keys, as shown in FIG. 9.

Since this example in FIG. 9 is a mirror image of the example in FIG. 8, both keymaps provide equal efficacy and convenience to both right-handed and left-handed users. In addition, an application may contain two patterns of keymaps to offer the same benefit to both right-handed and left-handed users. The application may contain two patterns of "cursor mode" keymap and select its "cursor mode" keymap depending on the dominant hand of the user. By designating data representative of the user's dominant hand to the system (CPU, operating system, keyboard driver, active or running application(s), and/or input controller 120), all users, whether right-handed or left-handed, can enjoy the same benefit of this invention equally.

Figure 10:
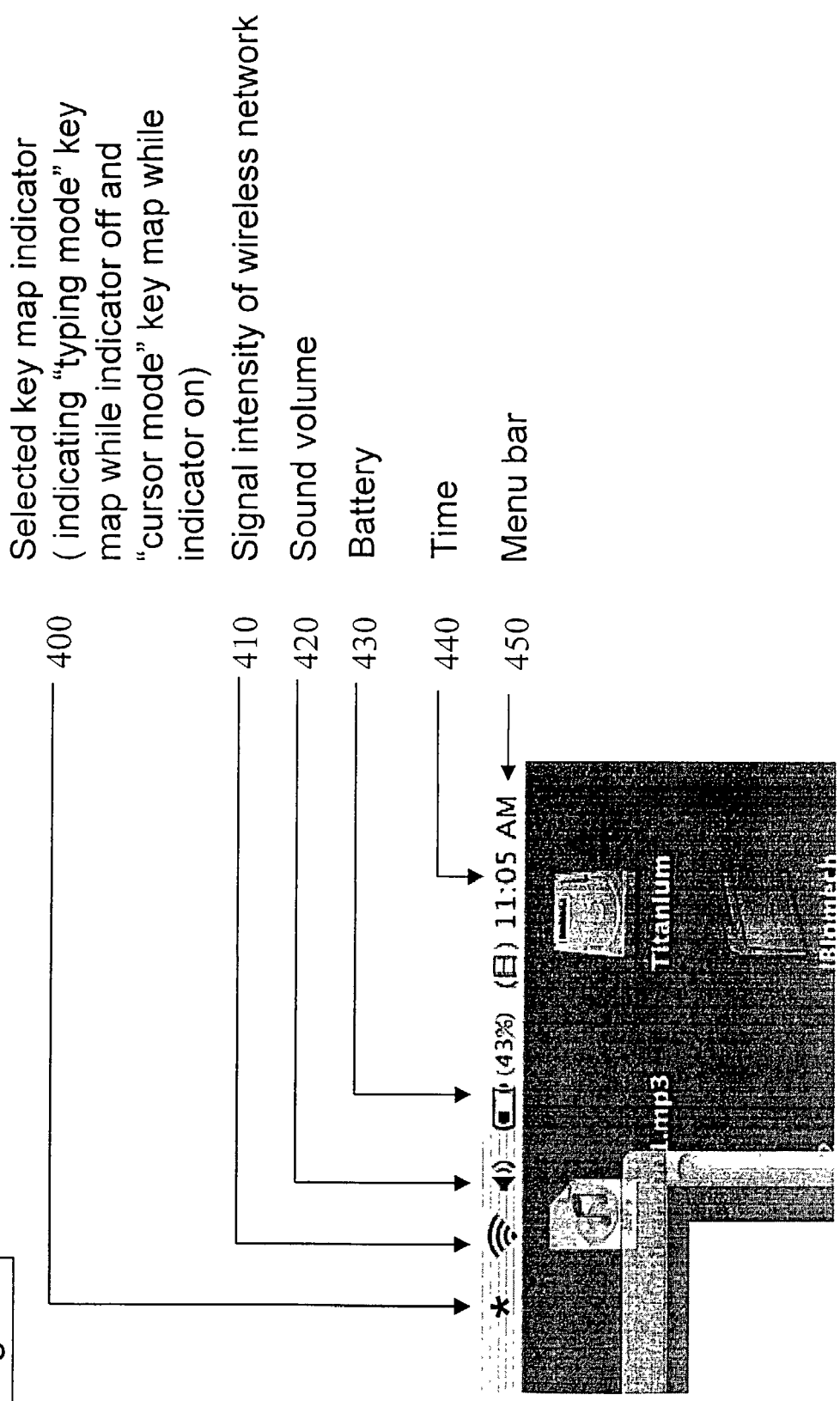
FIG. 10 shows an example of an indication on a display screen indicating the currently selected key map, namely an icon indicating either typing mode or cursor mode.

FIG. 10 shows an example, which shows how the selected (switched) keymap is indicated on a computer display screen. Because sometimes the user might want to know which keymap ("typing mode" or "cursor mode") is selected or activated, it is useful to always display an icon or other symbol representing the selected keymap on the computer screen. In FIG. 10, an asterisk (*) or similar indicator is displayed on the menu bar on the screen. While the indicator is "on," it means that the "cursor mode" keymap is currently active. While the indicator is "off," it means that the "typing mode" keymap is currently active. Then, the user can identify the selected keymap by checking the indicator. Similarly, the selected keymap can be indicated by one or more lights, such as LEDs (light-emitting diodes) placed on the surface of, or within the body of the computer, keyboard (s), pointing device(s) and/or other hardware.

The currently active keymap may also be signaled to the user by switching the appearance of the mouse cursor (mouse pointer) on the computer screen.

Figure 11:
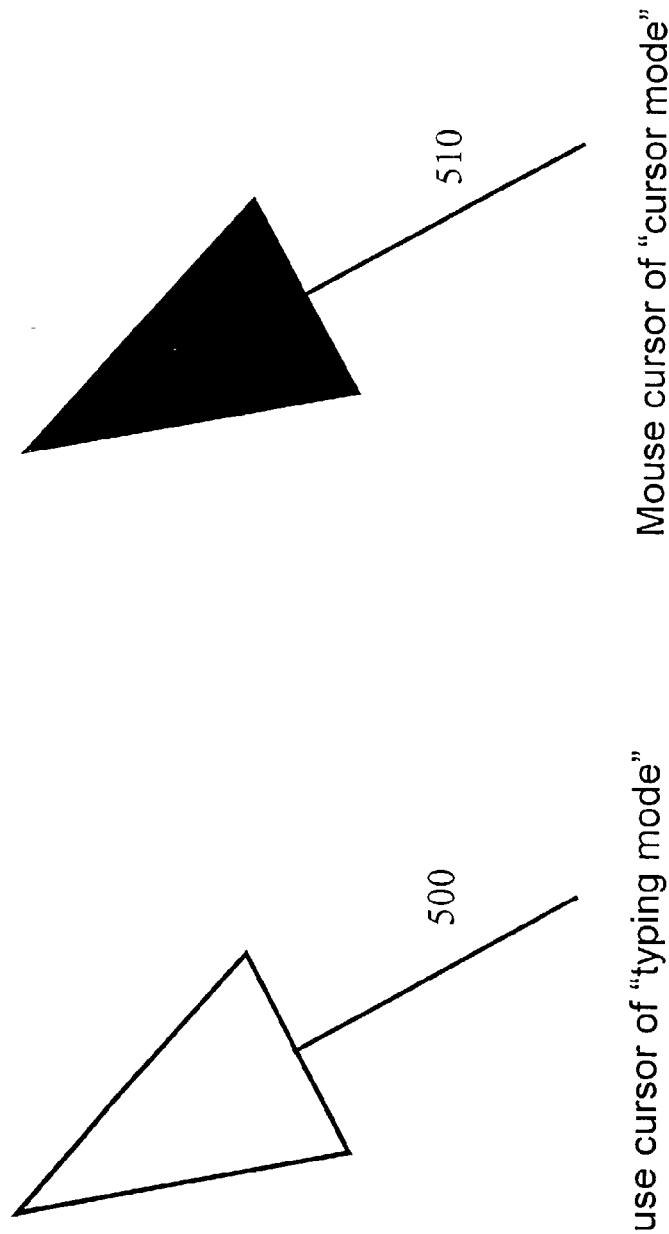
FIG. 11 shows an example of how the displayed cursor symbol may change in appearance depending upon whether the user has selected typing mode or cursor mode.

In FIG. 11, two examples of mouse cursors are shown. During "typing mode", the mouse cursor may be an open arrow to indicate that "typing mode" keymap has been selected. When the keymap is switched to "cursor mode" keymap, the system (CPU, operating system, input controller and/or keyboard driver) may change the appearance of the mouse cursor immediately from an open arrow to a solid arrow, or by changing the size or shape of the cursor. Because the user usually looks at the mouse cursor when he or she wants to perform mouse clicking, it is very helpful and useful to tell the user which keymap is selected, by changing the appearance of the mouse cursor.

FIG. 12 shows an example of a sensor attached to a pointing device to indicate whether the user's finger or hand is touching, or in close proximity to the pointing device. Because some types of pointing devices (such as the joystick, track stick, desktop mouse, trackball and pen) cannot function or have difficulty functioning as pressure sensors or touch sensors by themselves to switch the keymap, one or more separate sensor(s) may be provided to detect whether the user is touching or not touching the pointing device. In this example, the pointing device is a joystick 620 connected to the computer. A sensor 610 with sensing surface 630 may be provided on the top surface. Alternatively, a side sensor 640 may be provided on the body (vertical shaft) of the pointing device. By the additional sensor(s), the input controller 120 can detect whether the user is touching or not touching the pointing device before the user initiates actual cursor movement.

The present invention can also accommodate another situation that may arise from time to time. This relates to the use of a so-called "text-edit (input)" feature found in some applications. Text-edit (input) objects are windows or columns that require text inputs or text editing by the user.

As previously discussed, there are at least four ways to detect (or determine) the "using/not-using" status (i.e., whether or not the user is operating the pointing device at a particular moment): (1) use the pointing device as a sensor in itself to detect whether the user is operating the pointing device or not; (2) use one or more additional sensors placed on, or close to the pointing device to generate a special signal upon the detection of the user's finger or hand touching or in close proximity to the pointing device; (3) use a signal representing movement of the cursor symbol on the screen (as opposed to physical movement of a finger or hand on the cursor symbol on the screen the g device), perhaps together with a short time delay after the cursor stops moving; or (4) detect a "text-edit (input)" object that has been activated by the user.

Regarding the fourth method, typical examples of text-edit (input) objects include: a window that displays a word processor document, a keyword-input window (column) for a database search, a column that indicates a file name or folder name, a window of displaying E-mail software, a URL window of a web browser software, and so on.

Usually, when a text-edit (input) object is activated by the user by clicking on the object or by using a "tab" key, a "typing cursor", which is different from a "mouse cursor", is displayed between the texts on the text-edit (input) object and starts blinking to indicate its "active" status and also to show where next text characters are going to be inserted. Such a blinking "typing cursor" on an activated text-edit (input) object lets the user know that the object has been activated and is waiting for the user to input new text or to edit the existing text on the object.

Usually such a text-edit object has to be activated by the user by clicking on it or by using a "tab" key before inputting or editing text. When the user activates one of the text-edit objects, the activated text-edit object starts to "wait" for any input from the keyboard. An activated text-edit (input) object is de-activated by the user by clicking on another place or by activating another object.

Normally, the user prefers to use a "typing mode" keymap only when one of the text-edit objects is currently active and waiting for the user to input or edit text. Most users usually do not need to use a "typing mode" keymap if no text-edit object is active at a given time, because the machine will not normally display text on the screen in such a situation.

Thus, this embodiment of the invention defines that the user is "not using" the pointing device if one of the text-edit objects is activated, and defines that the user is "using" the pointing device if no text-edit object is activated. In this way, the system therefore selects the "cursor mode" keymap while no text-edit object is activated, and then the system switches to the "typing mode" keymap upon detection of activation of a text-edit object. When the user deactivates the text-edit object, the system deactivates the "typing mode" keymap and activates the "cursor mode" keymap again.

It should be noted that in the above-mentioned embodiment, the system assumes the user to be "using" the pointing device even while the user is "doing nothing", as long as none of text-edit (input) objects has been activated. In contrast, the previously-described embodiments (using the first three above-described detecting methods) assume that the user is "not using" the pointing device when the user is doing nothing.

It is also important to note that the system in this embodiment assumes that the user is "not using" the pointing device even while the user is actually "using" the pointing device, as long as one of text-edit (input) objects has been selected. In contrast, the other three detecting methods assume that the user is "using" the pointing device in the same situation.

Technically, using the fourth detecting method described above, sometimes the "typing mode" keymap is selected even though the user is touching the pointing device. For example, when the user moves the mouse cursor after activating a text-object, the mouse cursor actually moves even though a typing cursor remains blinking (i.e. the text-object is still in activated status.) But, in this embodiment, the system selects the "typing mode" keymap, even though the user is now moving the mouse cursor using the pointing device.

Among the four ways to detect the using/not-using status, only the first method (1) and the second method (2) require the system to monitor (watch) the pointing device directly. In other words, in the first method (1) and the second method (2), the decision depends upon physical and relative distance between the user's finger and the pointing device. The pointing device might have to be customized or designed to provide special signals representing the user's touching or operating or intention to operate the pointing device. On the other hand, in the third method (3) and the fourth method (4), the system doesn't need to monitor the pointing device itself but just needs to watch and analyze the signals that represent actual movement of the mouse cursor on the display, or just needs to watch or look for activated text-edit objects. In other words, in the third method (3) and the forth method (4), it doesn't matter how many or what kind of pointing device(s) is used or connected the computer, and only the signals or the activation status of text-edit objects is required to make a decision.

Features described in this invention can be easily applied to both desktop computers and notebook (portable, mobile) computers and other devices, such as personal digital assistants or cell phones, including any kind of computer devices that have one or more keys and a pointing device.

In summary, it is important to note that this invention provides one or more complete sets of alternative keymaps to conventional input device(s) by means of switching keymaps from a "typing mode" keymap to a "cursor mode" keymap upon the detection of a finger touching, or in close proximity to, the pointing device, or upon otherwise determining that the user is operating or intending to operate the pointing device. This means that all keys on the keyboard may switch their functions to any kind of functions or sets of functions (such as command scripts). Moreover, an application may contain its own "cursor mode" keymap(s) (application-specific "cursor mode" keymaps) for both right-handed users and left-handed users separately.

In a preferred embodiment, conventional, separate mouse click buttons are also provided on or near the keyboard or pointing device for users who prefer this arrangement.

While the invention has been described herein with reference to certain preferred embodiments, these embodiments have been presented by way of example only, and not to limit the scope of the invention.

What is claimed is:

1. A method for switching functions of one or more keys of a computer keyboard, comprising the steps of:

activating a keyboard having a plurality of text typing keys, the keyboard being coupled to a pointing device that remains active at all times to permit a user to achieve instant manual control of a cursor on a display screen;

activating a first keymap for enabling the user to manually activate a text typing mode at the keyboard;

determining whether the user is operating the pointing device; and deactivating the first keymap and activating a second keymap upon determination that the user is operating the pointing device, the second keymap operable to enable the user to manually activate a cursor mode at the keyboard;

whereby one or more keys of the keyboard are enabled by the second keymap to control pointing device functions.

2. The method of claim 1 whereby, upon activation of the second keymap, functions of selected text typing keys on the keyboard are switched into cursor control functions that are specified by an active application.

3. The method of claim 1 whereby neither the first keymap nor the second keymap is switched to another keymap while at least one key on the keyboard is held pressed.

4. The method of claim 1 whereby shortcut keys are detected and executed regardless of whether the first keymap or second keymap is activated.

5. The method of claim 1 whereby functions of at least one typing key on the keyboard is switched to enable mouse click functions upon activation of the second keymap.

6. The method of claim 2 whereby functions of at least one typing key on the keyboard is switched to enable window scroll functions upon activation of the second keymap.

7. The method of claim 1 whereby functions of at least one typing key on the keyboard is switched to enable page back/forward functions upon activation of the second keymap.

8. The method of claim 1 whereby functions of at least one typing key on the keyboard is switched to enable script execution functions upon activation of the second keymap.

9. The method of claim 1 whereby functions of at least one typing key on the keyboard is switched to enable launch application functions upon activation of the second keymap.

10. The method of claim 1 whereby functions of at least one typing key on the keyboard is switched to enable open file functions upon activation of the second keymap.

11. The method of claim 1 whereby functions of at least one typing key on the keyboard is switched to enable sound volume control functions upon activation of the second keymap.

12. The method of claim 1 whereby functions of at least one typing key on the keyboard is switched to enable display-brightness-control functions upon activation of the second keymap.

13. The method of claim 1 whereby an icon on the display screen indicates whether the first keymap or second keymap is activated.

14. The method of claim 1 whereby a light indicates whether the first keymap or second keymap is activated.

15. The method of claim 1 whereby the appearance of a cursor on the display screen indicates whether the first keymap or second keymap is activated.

16. The method of claim 1 whereby two sets each of the first keymap and second keymap are stored in a computer memory, one set configured for right-handed users and the other set configured for left-handed users.

17. The method of claim 1 whereby at least one separate mouse click button is provided in addition to the first keymap and second keymap.

18. The method of claim 1 whereby functions of at least one typing key on the keyboard is switched into special keys that change the functions of other keys upon activation of the second keymap.

19. The method of claim 1 whereby the first keymap is activated while a text-edit object is active.

20. The method of claim 1 whereby the second keymap is activated while no text-edit object is active.

* * * * *